Sept. 15, 1936. W. J. BESLER ET AL 2,054,569
RAILWAY TRUCK
Filed May 18, 1935 3 Sheets-Sheet 3
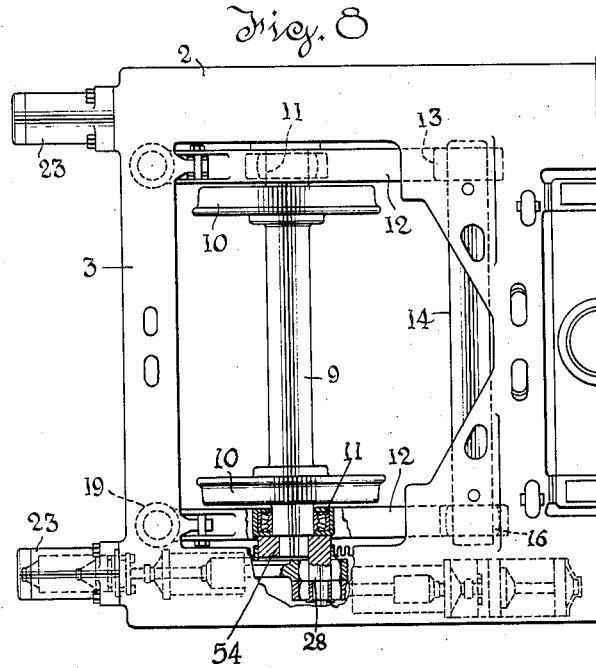
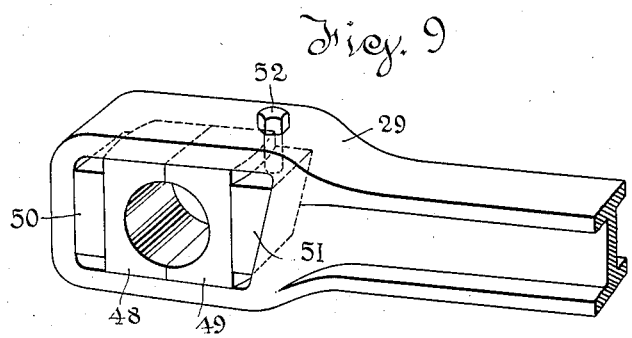
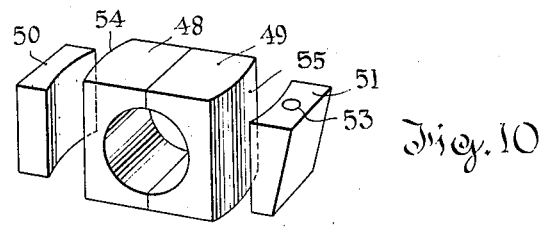
Inventor
William J. Besler
and Stanley J. Whitlock
Attorney.

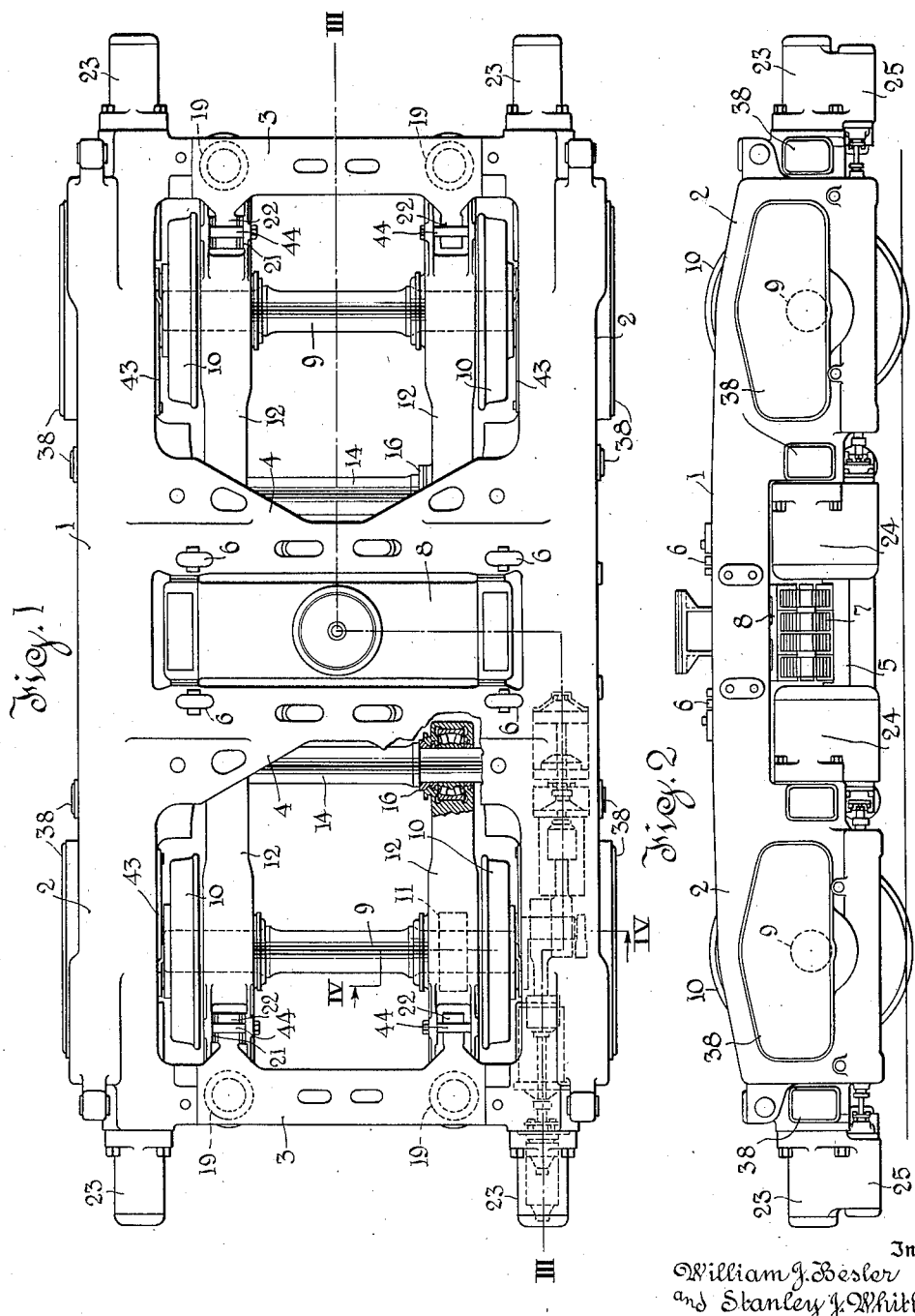

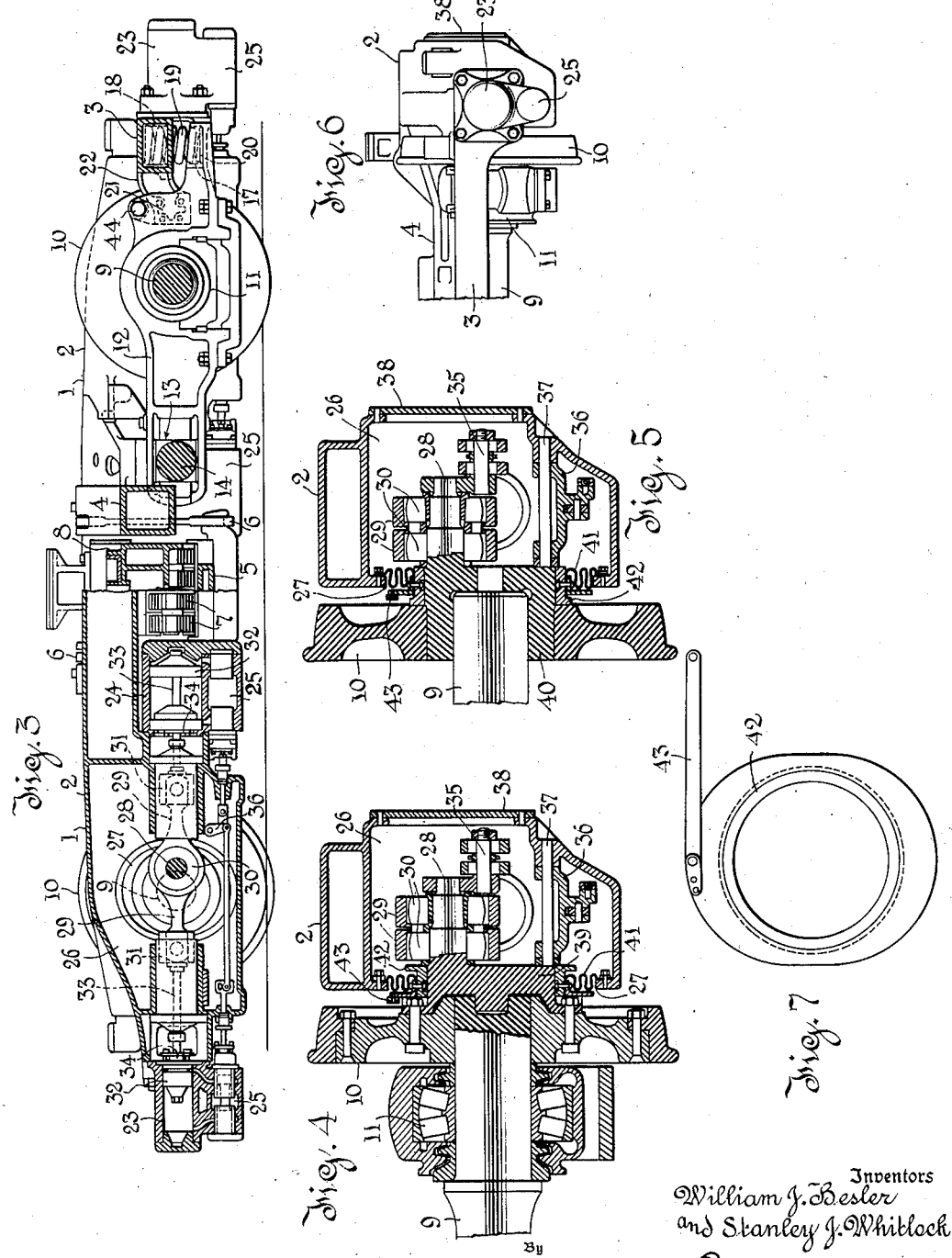

Patented Sept. 15, 1936

2,054,569

UNITED STATES PATENT OFFICE 2,054,569

RAILWAY TRUCK

William J. Besler, Plainfield, N. J., and Stanley J. Whitlock, Oakland, Calif., assignors to Besler Systems, Emeryville, Calif., a corporation of California Application May 18, 1935, Serial No. 22,280

12 Claims. (Cl. 105—133)

This invention relates to engine-driven trucks for rail vehicles and the like, and is directed particularly to the structural details of mountings for the axles and engines in the truck frame.

For a number of years, railway rolling stock has been of heavy construction and used with powerful locomotive engines designed to haul long trains. Recently, it has been found practical to lower operating costs and to speed railway traffic by resort to somewhat smaller and lighter equipment, operated at relatively high speeds. For passenger traffic especially, it has been found desirable to provide each individual vehicle with its own motive power, or to provide unit trains composed of a small number of vehicles, one or more of which is provided with complete motive power equipment.

In line with this recent trend of development, vehicles with trucks having motor equipment mounted thereon have been used. It is the object of this invention to provide an improved railway truck construction of the above general character, possessing desirable operative and running features, together with efficient and accessible driving engines which are preferably of the expansible chamber type.

It is a further object of the instant invention to provide a vehicle truck, carrying driving engines which may e. g. be economically operated with high pressure steam to be generated in a boiler carried on the vehicle supported by the truck, although the invention also contemplates the use of other types of expansible chamber engines, for example, those using steam at ordinary pressures, internal combustion engines and the like.

Another object of the invention is the provision of an engine-driven railway truck having a minimum of unsprung weight, and having its driven axle journals pivotally connected to the truck frame, whereby the vehicle that is supported on the truck may be operated with a desirable freedom from vibration and journal box slap at both low and high operating speeds.

Another object of this invention is the provision of a vehicle truck having a plurality of symmetrically placed driving engines, supported relatively low in the truck frame and directed connected to crank pins on the ends of truck axles.

It is also an object of the instant invention to provide an engine-driven truck construction in which each engine is constructed with a lubricant-tight crankcase that is integral with, and forms a part of the truck frame; and with the moving parts of the engines and the driving connections with the axles readily accessible for inspection and repair.

Other objects and advantages of the invention will be apparent from the following detailed description of the embodiments of the invention shown in the accompanying drawings, wherein:

Figure 1 is a plan view partly in section of a two-axle four-wheel railway truck embodying the invention.

Figure 2 is a side elevation view of the railway truck shown in Fig. 1.

Figure 3 is a vertical section view taken on the line III—III of Fig. 1.

Figure 4 is a vertical section view taken on the line IV—IV of Figure 1 and showing the direct driving connection between an engine and the adjacent axle.

Figure 5 is a vertical section view of a modification of the construction shown in Fig. 4.

Figure 6 is a half end elevation view of the truck.

Figure 7 is an elevation view of the engine crankcase seal shown in Figs. 4 and 5.

Figure 8 is a plan view partly in section of a modification of the truck shown in Fig. 1.

Figure 9 is a perspective view of a preferred form of wrist pin bearing.

Figure 10 is an exploded perspective view of elements of the bearing shown in Fig. 9.

Referring to the drawings, for the purposes of illustration, the embodiment of the invention in a two-axle four-wheel railway truck is shown. The invention is also applicable to trucks having more than two axles, as will be apparent from the following description, although the two-axle bogie, with each axle driven by a symmetrical placing of engines has its advantages, and constitutes a preferred embodiment.

The truck frame is indicated in general by the numeral 1, and comprises longitudinal side members 2, connected by end members 3 and transom members 4. The truck frame is preferably a rigid structure, and an integral steel casting as shown; but it may be an assembled frame formed of individual members which are connected together to form either a rigid or non-rigid structure. The frame members, in the interest of light weight, are preferably hollow, and generally of rectangular cross section to provide ample strength, with minimum weight.

A transverse spring plank 5 is suspended from the truck frame by conventional links 6, depending from the transom members 4. Suitable springs 7 are carried by the spring plank for resiliently supporting the truck bolster 8 and the weight of the vehicle (not shown), which rests on the usual center and side bearings of the bolster.

In the trucks illustrated, the axles 9 provided with wheels 10 are journalled in spherical self-aligning roller bearings 11 which latter are carried by the longitudinal journal arms 12. These journal arms are also provided with suitable bearings 13 in their inboard ends for pivotally supporting the arms from the fixed transverse shafts or members 14. Each shaft 14 is rigidly secured in the truck frame by suitable caps or brackets bolted to the frame. One of the journal arm bearings 13 on each shaft 14 is preferably of the self-aligning roller type as indicated at 16 (Fig. 1 and Fig. 8) to provide limited flexibility for accommodating twisting or lateral motion of one journal arm on each axle due to uneven track conditions or the like.

The outboard ends of the journal arms 12 are provided with recesses 17 or the like in approximate vertical alignment with similar recesses 18 in the frame end members 3. Coil springs 19 are positioned in and between the recesses 17 and 18 for resiliently supporting and transmitting the weight of the truck frame to the journal arms. Liners or shims 20 may be inserted in the recesses 17 under the springs, where it is necessary to adjust or equalize spring tensions. Leaf springs may be substituted for the coil springs shown, and suitable known spring control devices may be used, with either type of springs, to dampen their action.

The pivoted journal arms 12 adjacent their upper outer ends are also provided with the parallel bearing surfaces or guide plates 21 arranged in vertical planes for engagement with similar surfaces or wear plates on the guide flanges 22 of the truck frame. In order to allow for slight twisting or lateral movement of the journal arm which pivots on a spherical self-aligning bearing 16, it is preferable to omit the use of confining guide plates 21 on the outboard end of such arm. The use of guide plates 21 for one journal arm for each axle limits transverse movement of the wheels and axle with respect to the truck frame, but allows the journal arm to pivot freely about the supporting shaft 14 in a vertical plane. Each journal arm may also have upstanding flanges carrying a horizontal bolt 44 for limiting excessive downward movement of arm with respect to truck frame guide flanges 22.

Referring to Figure 8 of the drawings, a suitable construction embodying use of journal arms arranged to carry journal bearings 11 outboard of the truck wheels is shown. The construction is similar to that shown in Figure 1 except that the axle journal bearings 11 are arranged on the axles 9 outside of the wheels 10 rather than between the wheels.

The above-described pivotal axle mounting gives excellent running characteristics to the truck. By its use, journal box slap and vibration are effectively reduced, and the amount of unsprung weight is relatively small. The use of the self-aligning bearings and a journal arm for each wheel permits desirable flexibility of individual wheel and axle movement, and also serves to effectively prevent excessive torsional stresses from being transmitted to the truck frame.

The engines, or motors, for driving the truck are positioned outboard of the truck wheels, as distinguished from being located between the wheels. In the two-axle truck illustrated, both ends of each axle are provided with an engine unit having opposed cylinders, in 180° relation, and with the cylinders of each unit somewhat laterally offset from each other, as shown in Figs. 1 and 3. Each engine is mounted on and partly within the truck frame, is horizontally disposed, and directly connected to the end of the adjacent axle as hereinafter described in detail. The engines may be conveniently operated with steam pressure, either high or low in value, generated in a boiler that is carried on the vehicle, suitable flexible connections and conduits being provided to convey the steam from the boiler to the truck. Other types of expansible chamber engines, such as those operated by the combustion of gasoline or oils at high or low operating pressures may obviously be substituted for the steam engines shown in the drawings.

Referring particularly to Fig. 3, a driving engine is shown comprising the opposed cylinders 23 and 24 bolted to the frame side member 2. The engine may function as a compound engine, wherein high pressure steam is used in cylinder 23 and low pressure steam in cylinder 24. Each cylinder is provided with a slide valve, inlet and exhaust ports of conventional character, and indicated generally by the numeral 25.

A portion 26 of the hollow side frame member 2 to which the cylinders 23 and 24 are secured is utilized as the engine crankcase. The inner wall of the crankcase is provided with an opening 27 (Fig. 3) and through which the crankpin 28, secured to the end of the axle 9, projects into the crankcase. The engine connecting rods 29 have one end journalled on the crankpin 28, and preferably with self-aligning bearings 30. The other end of each of the connecting rods 29 is connected to a crosshead 31 preferably by means of a self-aligning bearing such as shown in Figures 9 and 10. The bearing blocks 48 and 49 surround a wrist pin carried by the crosshead 31. The outer surfaces 54 and 55 of the blocks 48 and 49 respectively are cylindrical and engage complementary surfaces of the blocks 50 and 51 respectively. The blocks 50 and 51 are positioned in an opening in the end of the connecting rod 29. The element 51 is preferably wedge shaped in order that the bearing contact pressure may be adjusted by means of the bolt 52 engaging the connecting rod end and the recess 53 in wedge block 51. The crosshead 31 is connected to the piston 32 by a piston rod 33 passing through suitable packing 34.

The crankpin 28 is secured to the end of the axle 9 in such a way that the crankpin, axle, and wheel revolve together. As shown in Fig. 4, the crankpin 28 is formed integral with a crank disc 39, rigidly but detachably secured to the wheel 10 by bolts. The wheel hub is secured to the axle 9 by conventional means as e. g. by shrinking. In the modification illustrated in Fig. 5, the crankpin 28 is formed integral with a sleeve 40 which extends over the end of the axle 9 and within the hub of the wheel 10. In the construction shown in Fig. 8 the crank disc 56 bearing the crank pin 28 is secured to the stub end of the axle 9 outboard of the journal bearing 11 and the wheels 10 are secured to the axle inboard of the bearings 11. The crankpin 28, in either form of construction is provided with an offset pin bearing 35 at its outboard end. Suitable linkage is connected to the pin bearing 35 by self-aligning bearings for actuating the slide valve of each cylinder. The valve actuating linkage 36 is pivotally supported on bearings 37 attached to the crankcase wall. Suitable lever system (not shown) may be provided for controlling the valve actuation and for reversing the engines.

The crankpin on one end of an axle is preferably fixed at an angle of ninety degrees with respect to the crankpin on the opposite end of the same axle, in order to properly and evenly distribute the power impulses.

The opening 27 in the crankcase wall, and through which the crankpin 28 extends into the crankcase, allows the wheel and axle to move with respect to the engine and truck frame. As the truck wheel 10 is pushed upwards, for example, by uneven tracks, the axle 9 may move on the arc of a circle having the shaft 14 as its center. The crankcase opening 27 is closed by a flexible seal 41 of leather or the like. This seal 41 has its outer edge attached to the crankcase wall. The inner edge of the flexible seal 41 is attached to a ring 42 of bronze or the like closely surrounding the crankpin support 39 or 40, (Figs. 4 and 5) as the case may be. The ring 42 is prevented from rotating with the crankpin and thereby tearing the flexible seal by the use of a link 43 pivotally connected to the ring 42 and to the crankcase wall (Fig. 7).

The outer wall of the crankcase is provided with suitable openings having removable covers 38 to allow convenient inspection and adjustment of the engine parts within the closed crankcase 26. When the covers 38 are secured in place, the crankcase is fully closed thereby preventing dust and moisture from reaching the engine moving parts. A lubricant sump may be provided in the lower portion of the crankcase, and pressure means may be used to distribute a bath of lubricant to the various bearings, crossheads, and linkage which operate in the crankcase.

One of the important advantages of the above-described type of engine mounting is the accessibility of all parts of the engine. Worn cylinders and valve gear may be easily removed and replaced with new parts without removing the vehicle from the truck or taking out the wheels and axles. The various engine bearings and valve actuating linkage are easily reached for repair through the openings at both sides of the truck in the crankcase wall.

A further advantage of locating the truck frame and engines outboard of the wheels is the fact that such construction allows the vehicle body to be arranged relatively close to the axles, whereby the center of gravity of the truck-vehicle unit may be lower than in the conventional engine driven truck construction.

Another advantage of the instant invention is the simplicity of design. By providing that the truck frame also functions as an engine crankcase, the number of parts is materially reduced. No gears or separate engine main bearings are required. The use of the pivoted journal arms assists in the elimination of play in the axle mounting and provides a practical and efficient means for transmitting the engine driving thrust to the truck frame.

This invention also contemplates the use of other types of bearings, linkage and connections than those described, as it will be apparent to one skilled in the art that such variations are possible.

We claim:

1. An engine-driven railway truck comprising, in combination, a truck frame having side and transom members connected together, wheels and axles for supporting the truck frame, at least one of said axles being arranged to be driven by power impulses applied to the ends thereof, means pivotally connecting the driven axle to the truck frame for transmitting the driving thrust thereto and for permitting the driven axle to tilt with respect to said frame, journal bearings for said driven axle mounted in said means, load cushioning means interposed between the first mentioned means and the truck frame, and reciprocating engines mounted on the truck frame, one at either side thereof directly connected to the adjacent end of said driven axle.

2. An engine-driven railway truck comprising, in combination, a truck frame having side and transom members connected together, wheels and axles for supporting the truck frame, at least one of said axles being arranged to be driven by power impulses applied to the ends thereof, longitudinally extending journal arms pivotally connecting the driven axle to the truck frame for transmitting the driving thrust thereto, journal bearings for said driven axle mounted in said arms, load cushioning means interposed between the journal arms and the truck frame, and reciprocating engines mounted on the truck frame, one at either side thereof directly connected to the adjacent end of said driven axle.

3. An engine-driven railway truck comprising, in combination, a truck frame having side and transom members connected together, wheels and axles for supporting the truck frame, at least one of said axles being arranged to be driven by power impulses applied to the ends thereof, a pair of longitudinally extending journal arms connecting the driven axle to the truck frame for transmitting the driving thrust thereto, the inner ends of said arms being pivotally connected to the truck frame, load cushioning means interposed between the outer ends of said arms and the truck frame for resiliently supporting the latter, journal bearings for said driven axle positioned between the wheels and mounted in said journal arms, and reciprocating engines mounted on the truck frame, one at either side thereof directly connected to the adjacent end of said driven axle.

4. An engine-driven railway truck comprising, in combination, a truck frame having side and transom members connected together, wheels and axles for supporting the truck frame, at least one of said axles being arranged to be driven by power impulses applied to the ends thereof, a pair of longitudinally extending journal arms connecting the driven axle to the truck frame for transmitting the driving thrust thereto, the inners ends of said arms being pivotally connected to the truck frame, load cushioning means interposed between the outer ends of said arms and the truck frame for resiliently supporting the latter, journal bearings for said axle mounted in said journal arms, said bearings being self-aligning to permit the said arms to oscillate in a vertical plane as the said axle is tilted with respect to said truck frame, and reciprocating engines mounted on the truck frame, one at either side thereof directly connected to the adjacent end of said driven axle.

5. An engine-driven railway truck comprising, in combination, a truck frame having side and transom members connected together, wheels and axles for supporting the truck frame, at least one of said axles being arranged to be driven by power impulses applied to the ends thereof, a pair of longitudinally extending journal arms connecting the driven axle to the truck frame for transmitting the driving thrust thereto, a transverse member secured to said truck frame, bearings positioned on said member and mounted in the inner ends of said journal arms, one of said bearings being of the self-aligning type, load cushioning means interposed between the outer ends of said arms and the truck frame for resiliently supporting the latter, journal bearings for said axle mounted in said journal arms, said journal bearings being of the self-aligning type permitting the journal arms to oscillate in a vertical plane as the said axle is tilted with respect to said frame, and reciprocating engines mounted on the truck frame, one at either side thereof directly connected to the adjacent end of said driven axle.

6. An engine-driven railway truck comprising, in combination, a truck frame having side and transom members connected together, wheels and axles for supporting the truck frame, at least one of said axles being arranged to be driven by power impulses applied to the ends thereof, means pivotally connecting the driven axle to the truck frame for transmitting the driving thrust thereto and for permitting the driven axle to tilt with respect to said frame, journal bearings for said driven axle mounted in said means, load cushioning means interposed between the first mentioned means and the truck frame, and reciprocating engines mounted on the truck frame, one at either side thereof directly connected to the adjacent end of said driven axle, said engines being so mounted that the axes of the cylinders thereof are substantially in the horizontal plane containing the axis of said driven axle.

7. An engine-driven railway truck comprising, in combination, a truck frame having side and transom members connected together, wheels and axles for supporting the truck frame, at least one of said axles being arranged to be driven by power impulses applied to the ends thereof, means pivotally connecting the driven axle to the truck frame for transmitting the driving thrust thereto and for permitting the driven axle to tilt with respect to said frame, journal bearings for said driven axle mounted in said means, load cushioning means interposed between the first mentioned means and the truck frame, a two cylinder reciprocating engine mounted on the truck frame, the axis of one of said cylinders being at an angle of 180° with respect to the axis of the other cylinder and laterally offset therefrom, and a driving connection between said engine and the adjacent end of said driven axle.

8. An engine-driven railway truck comprising, in combination, a truck frame having substantially hollow side and transom members connected together, wheels and axles for supporting the truck frame, at least one of said axles being arranged to be driven by power impulses applied to the ends thereof, means pivotally connecting the driven axle to the truck frame for transmitting the driving thrust thereto and for permitting the axle to tilt with respect to said frame, journal bearings for said driven axle mounted in said means, load cushioning means interposed between the first mentioned means and the truck frame, reciprocating engines mounted on and in said frame side members, hollow portions of said members forming crankcases for said engines, and a driving connection between each of said engines and the adjacent end of said driven axle.

9. An engine-driven railway truck comprising, in combination, a truck frame having substantially hollow side and transom members connected together, wheels and axles for supporting the truck frame, at least one of said axles being arranged to be driven by power impulses applied to the ends thereof, means pivotally connecting the driven axle to the truck frame for transmitting the driving thrust thereto and for permitting the axle to tilt with respect to said frame, journal bearings for said driven axle mounted in said means, load cushioning means interposed between the first mentioned means and the truck frame, a crankpin secured to each end of said driven axle, each crankpin projecting into the adjacent hollow side frame member through an opening in the wall thereof, a flexible lubricant-tight seal between said crankpin and the side frame member, and reciprocating engines mounted on the truck frame, one at either side thereof, each engine utilizing a portion of said hollow frame member as a crankcase and being directly connected to the adjacent crankpin.

10. An engine-driven railway truck comprising, in combination, a truck frame having rigidly connected side and transom members, a pair of axles with wheels thereon for supporting the truck frame, said axles being arranged to be driven by power impulses applied to both ends of each axle, a pair of longitudinally extending journal arms for each axle, said arms being arranged between the wheels and pivotally connecting the axles to said truck frame for transmitting the driving thrust thereto, load cushioning means interposed between the journal arms and the truck frame, journal bearings for said axles mounted in said journal arms, a crankpin rigidly secured to each end of each of said axles, and a reciprocating engine having opposed cylinders operatively connected to each of said crankpins, said engines being mounted on the side members of the truck frame outboard of the plane of the truck wheels.

11. An engine-driven railway truck comprising, in combination, a truck frame having substantially hollow side and transom members connected together, wheels and axles for supporting the truck frame, at least one of said axles being arranged to be driven by power impulses applied to the ends thereof, means pivotally connecting the driven axle to the truck frame for transmitting the driving thrust thereto and for permitting the axle to tilt with respect to said frame, journal bearings for said driven axle mounted in said means, load cushioning means interposed between the first mentioned means and the truck frame, reciprocating engines mounted on and in said frame side members, hollow portions of said members forming crankcases for said engines, a driving connection between each of said reciprocating engines and the adjacent end of said driven axle, and self-aligning wrist pin bearings in each of said engines for permitting limited lateral movement of said one of said axles with respect to the cylinder axis of each of said engines.

12. An engine-driven railway truck comprising, in combination, a truck frame having substantially hollow side and transom members connected together, wheels and axles for supporting the truck frame, at least one of said axles being arranged to be driven by power impulses applied to the ends thereof, means pivotally connecting the driven axle to the truck frame for transmitting the driving thrust thereto and for permitting the axle to tilt with respect to said frame, journal bearings for said driven axle mounted in said means, load cushioning means interposed between the first mentioned means and the truck frame, reciprocating engines mounted on and in said frame side members, hollow portions of said members forming crankcases for said engines, and a driving connection between each of said engines and the adjacent end of said driven axle, the said connection including a self-aligning bearing to maintain the driving connection during movements of the axle, which movements have a limited lateral component.

WILLIAM J. BESLER.
STANLEY J. WHITLOCK.